US008948891B2

(12) United States Patent
Lee et al.

(10) Patent No.: US 8,948,891 B2
(45) Date of Patent: Feb. 3, 2015

(54) METHOD AND APPARATUS FOR ENCODING/DECODING MULTI-CHANNEL AUDIO SIGNAL BY USING SEMANTIC INFORMATION

(75) Inventors: Nam-Suk Lee, Suwon-si (KR); Chul-woo Lee, Anyang-si (KR); Jong-hoon Jeong, Suwon-si (KR); Han-gil Moon, Seoul (KR); Hyun-wook Kim, Suwon-si (KR); Sang-hoon Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 995 days.

(21) Appl. No.: 12/648,948

(22) Filed: Dec. 29, 2009

(65) Prior Publication Data

US 2011/0038423 A1 Feb. 17, 2011

(30) Foreign Application Priority Data

Aug. 12, 2009 (KR) ........................ 10-2009-0074284

(51) Int. Cl.
*G06F 17/00* (2006.01)
*G10L 19/20* (2013.01)
*G10L 19/008* (2013.01)
*G10L 19/02* (2013.01)

(52) U.S. Cl.
CPC ............... *G10L 19/20* (2013.01); *G10L 19/008* (2013.01); *G10L 19/0204* (2013.01)
USPC ............................................................ 700/94

(58) Field of Classification Search
USPC ................... 700/94; 369/1–12; 704/500–504; 381/21, 119
See application file for complete search history.

(56) References Cited

U.S. PATENT DOCUMENTS

| | | | | |
|---|---|---|---|---|
| 6,545,209 | B1 | 4/2003 | Flannery et al. | |
| 6,748,395 | B1 | 6/2004 | Picker et al. | |
| 6,847,980 | B1 | 1/2005 | Benitez et al. | |
| 7,122,732 | B2 | 10/2006 | Cho et al. | |
| 7,620,546 | B2 | 11/2009 | Hetherington et al. | |
| 7,876,904 | B2 * | 1/2011 | Ojala et al. | 381/20 |
| 2002/0087569 | A1 | 7/2002 | Fischer et al. | |
| 2004/0231498 | A1 | 11/2004 | Li et al. | |

(Continued)

FOREIGN PATENT DOCUMENTS

| | | | |
|---|---|---|---|
| KR | 10-0370413 | B1 | 4/2003 |
| KR | 10-2004-0001306 | A | 1/2004 |

(Continued)

OTHER PUBLICATIONS

Oxford English Dictionary definition of “semantic,” retrieved Feb. 26, 2013.*

(Continued)

*Primary Examiner* — Andrew C Flanders
(74) *Attorney, Agent, or Firm* — Sughrue Mion, PLLC

(57) ABSTRACT

A multi-channel audio signal encoding and decoding method and apparatus are provided. The multi-channel audio signal encoding method, the method including: obtaining semantic information for each channel; determining a degree of similarity between multi-channels based on the obtained semantic information for each channel; determining similar channels among the multi-channels based on the determined degree of similarity between the multi-channels; and determining spatial parameters between the similar channels and down-mixing audio signals of the similar channels.

20 Claims, 8 Drawing Sheets

(56) References Cited

U.S. PATENT DOCUMENTS

| | | | | |
|---|---|---|---|---|
| 2004/0246862 | A1 | 12/2004 | Cho et al. | |
| 2005/0058304 | A1* | 3/2005 | Baumgarte et al. | 381/98 |
| 2005/0091165 | A1 | 4/2005 | Sezan et al. | |
| 2005/0157883 | A1* | 7/2005 | Herre et al. | 381/17 |
| 2006/0020958 | A1 | 1/2006 | Allamanche et al. | |
| 2006/0045295 | A1 | 3/2006 | Kim | |
| 2006/0129397 | A1 | 6/2006 | Li et al. | |
| 2008/0097756 | A1 | 4/2008 | De Lange et al. | |
| 2008/0175556 | A1 | 7/2008 | Dorai et al. | |
| 2008/0208570 | A1 | 8/2008 | Nam | |
| 2008/0243512 | A1 | 10/2008 | Breebaart et al. | |

FOREIGN PATENT DOCUMENTS

| | | | |
|---|---|---|---|
| KR | 10-2004-0069345 | A | 8/2004 |
| KR | 10-2004-0081992 | A | 9/2004 |
| KR | 10-2004-0103683 | A | 12/2004 |
| KR | 10-2004-0107705 | A | 12/2004 |
| KR | 10-2005-0051857 | A | 6/2005 |
| KR | 10-2005-0087291 | A | 8/2005 |
| KR | 10-2006-0000780 | A | 1/2006 |
| KR | 10-2006-0016468 | A | 2/2006 |
| KR | 10-2006-0019013 | A | 3/2006 |
| KR | 10-2006-0019096 | A | 3/2006 |
| KR | 10-2006-0020114 | A | 3/2006 |
| KR | 10-2006-0044629 | A | 5/2006 |
| KR | 10-2006-0087144 | A | 8/2006 |
| KR | 10-2006-0090687 | A | 8/2006 |
| KR | 10-2006-0091063 | A | 8/2006 |
| KR | 10-2006-0104734 | A | 10/2006 |
| KR | 10-2006-0110079 | A | 10/2006 |
| KR | 10-2007-0004891 | A | 1/2007 |
| KR | 10-2007-0017378 | A | 2/2007 |
| KR | 10-2007-0038118 | A | 4/2007 |
| KR | 10-2007-0048484 | A | 5/2007 |
| KR | 10-2007-0050271 | A | 5/2007 |
| KR | 10-2007-0050631 | A | 5/2007 |
| KR | 10-2007-0078170 | A | 7/2007 |
| KR | 10-2007-0085924 | A | 8/2007 |
| KR | 10-2007-0087399 | A | 8/2007 |
| KR | 10-2007-0088276 | A | 8/2007 |
| KR | 10-0745689 | B1 | 8/2007 |
| KR | 10-2008-0015997 | A | 2/2008 |
| KR | 10-2008-0050986 | A | 6/2008 |
| KR | 10-2008-0060641 | A | 7/2008 |
| KR | 10-2008-0071554 | A | 8/2008 |
| WO | 2006/006812 | A1 | 1/2006 |

OTHER PUBLICATIONS

Tao Li et al., "Content-Based Music Similarity Search and Emotion Detection", IEEE, Department of Computer Science, 2004, 4 pages.

George Tzanetakis et al., "Musical Genre Classification of Audio Signals", IEEE Transactions on Speech and Audio Processing, Jul. 2002, vol. 10, No. 5, 10 pages.

* cited by examiner

FIG. 2B

Musical Instrument Timbre Tool (205)

| | Sound families | Harmonic Sounds (211) | Inharmonic Sounds (212) | Percussive Sounds (213) | Non-coherent Sounds (214) |
|---|---|---|---|---|---|
| 215 | Sounds characteristics | Sustained<br>Harmonic<br>Coherent | Sustained<br>Non-Harmonic<br>Coherent | Non-Sustained | Sustained<br>Non-Coherent |
| 216 | Examples of sounds belonging to the family | Violin, flute, ... | bell, triangle | snare, claves, ... | cymbals, white noise, ... ... |
| 217 | Timbre Type | Harmonic<br>Instrument<br>TimbreType | | Percussive<br>Instument<br>TimberType | |

METHOD AND APPARATUS FOR ENCODING/DECODING MULTI-CHANNEL AUDIO SIGNAL BY USING SEMANTIC INFORMATION

CROSS-REFERENCE TO RELATED PATENT APPLICATION

This application claims the benefit of Korean Patent Application No. 10-2009-0074284, filed on Aug. 12, 2009, in the Korean Intellectual Property Office, the disclosure of which is incorporated herein by reference in its entirety.

BACKGROUND OF THE INVENTION

1. Field

Methods and apparatuses consistent with the disclosed embodiments relate to processing an audio signal, and more particularly, to encoding/decoding a multi-channel audio signal by using semantic information.

2. Description of the Related Art

Examples of a general multi-channel audio encoding algorithm include parametric stereo and Moving Pictures Experts Group (MPEG) surround. In parametric stereo, two channel audio signals are down-mixed in a whole frequency region and a mono-channel audio signal is generated. In MPEG surround, a 5.1 channel audio signal is down-mixed in a whole frequency region and a stereo channel audio signal is generated.

An encoding apparatus down-mixes a multi-channel audio signal, adds a spatial parameter to the down-mixed channel audio signal, and performs coding on the audio signal.

A decoding apparatus up-mixes the down-mixed audio signal by using the spatial parameter and restores the original multi-channel audio signal.

In this regard, when the encoding apparatus down-mixes predetermined channels, the decoding apparatus does not easily separate the channels, which deteriorates spatiality. Therefore, the encoding apparatus needs an efficient solution for easily separating channels which are down-mixed.

SUMMARY

One or more embodiments provide a method and apparatus for encoding/decoding a multi-channel audio signal that efficiently compress and restore a multi-channel audio signal by using semantic information.

According to an aspect of an exemplary embodiment, there is provided a multi-channel audio signal encoding method, the method including: obtaining semantic information for each channel; determining a degree of similarity between multi-channels based on the semantic information for each channel; determining similar channels among the multi-channels based on the determined degree of similarity between the multi-channels; and extracting spatial parameters between the similar channels and down-mixing audio signals of the similar channels.

According to an aspect of another exemplary embodiment, there is provided a multi-channel audio signal decoding method, the method including: extracting information about similar channels from an audio bitstream; extracting audio signals of the similar channels based on the extracted information about the similar channels; and decoding spatial parameters between the similar channels and up-mixing the extracted audio signals of the similar channels.

According to an aspect of another exemplary embodiment, there is provided a multi-channel audio signal decoding method, the method including: extracting semantic information from an audio bitstream; determining a degree of similarity between channels based on the extracted semantic information; extracting audio signals of the similar channels based on the determined degree of similarity between the channels; and decoding spatial parameters between similar channels and up-mixing the extracting the audio signals of the similar channels.

According to an aspect of another exemplary embodiment, there is provided a multi-channel audio signal encoding apparatus, the apparatus including: a channel similarity determining unit which determines a degree of similarity between multi-channels based on semantic information for each channel; a channel signal processing unit which generates spatial parameters between similar channels determined by the channel similarity determining unit and which down-mixes audio signals of the similar channels; a coding unit which encodes the down-mixed audio signals of the similar channels processed by the signal processing unit by using a predetermined codec; and a bitstream formatting unit which adds the semantic information for each channel or information about the similar channels to the audio signals encoded by the coding unit and which formats the audio signals as a bitstream.

According to an aspect of another exemplary embodiment, there is provided a multi-channel audio signal decoding apparatus, the apparatus including: a channel similarity determining unit which determines a degree of similarity between multi-channels from semantic information for each channel and which extracts audio signals of similar channels based on the degree of similarity between the multi-channels; an audio signal synthesis unit which decodes spatial parameters between the similar channels extracted by the channel similarity determining unit and which synthesizes audio signals of each sub-band by using the spatial parameters; a decoding unit which decodes the audio signals synthesized by the audio signal synthesis unit by using a predetermined codec; and an up-mixing unit which up-mixes the audio signals of the similar channels decoded by the decoding unit.

BRIEF DESCRIPTION OF THE DRAWINGS

The above and/or other aspects will become more apparent by describing in detail exemplary embodiments with reference to the attached drawings in which:

FIGS. 2A and 2B are tables of semantic information defined by the MPEG-7 standard according to an exemplary embodiment;

DETAILED DESCRIPTION OF EXEMPLARY EMBODIMENTS

Exemplary embodiments will now be described more fully with reference to the accompanying drawings.

Figure 1:
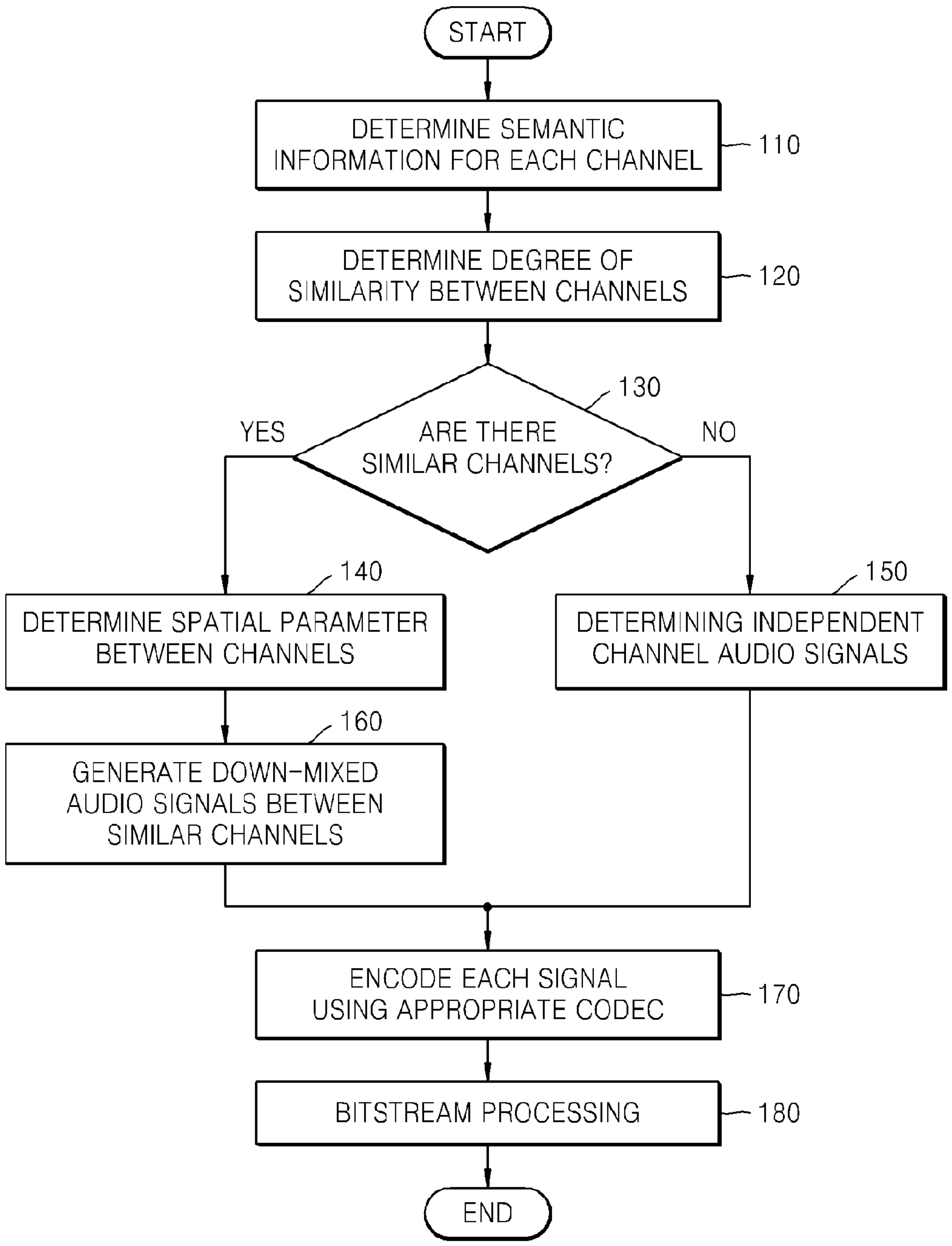
FIG. 1 is a flowchart illustrating a multi-channel audio signal encoding method according to an exemplary embodiment.

FIG. 1 is a flowchart illustrating a multi-channel audio signal encoding method according to an exemplary embodiment. Referring to FIG. 1, in operation 110, a user or a manufacturer prepares multi-channel audio signals and determines semantic information about each multi-channel audio signal. The semantic information about each multi-channel audio signal uses at least one of audio descriptors in the MPEG-7 standard. The semantic information is defined in a frame unit provided in a frequency of a particular channel. The semantic information defines the frequency characteristics of a corresponding channel audio signal.

Figure 2A:
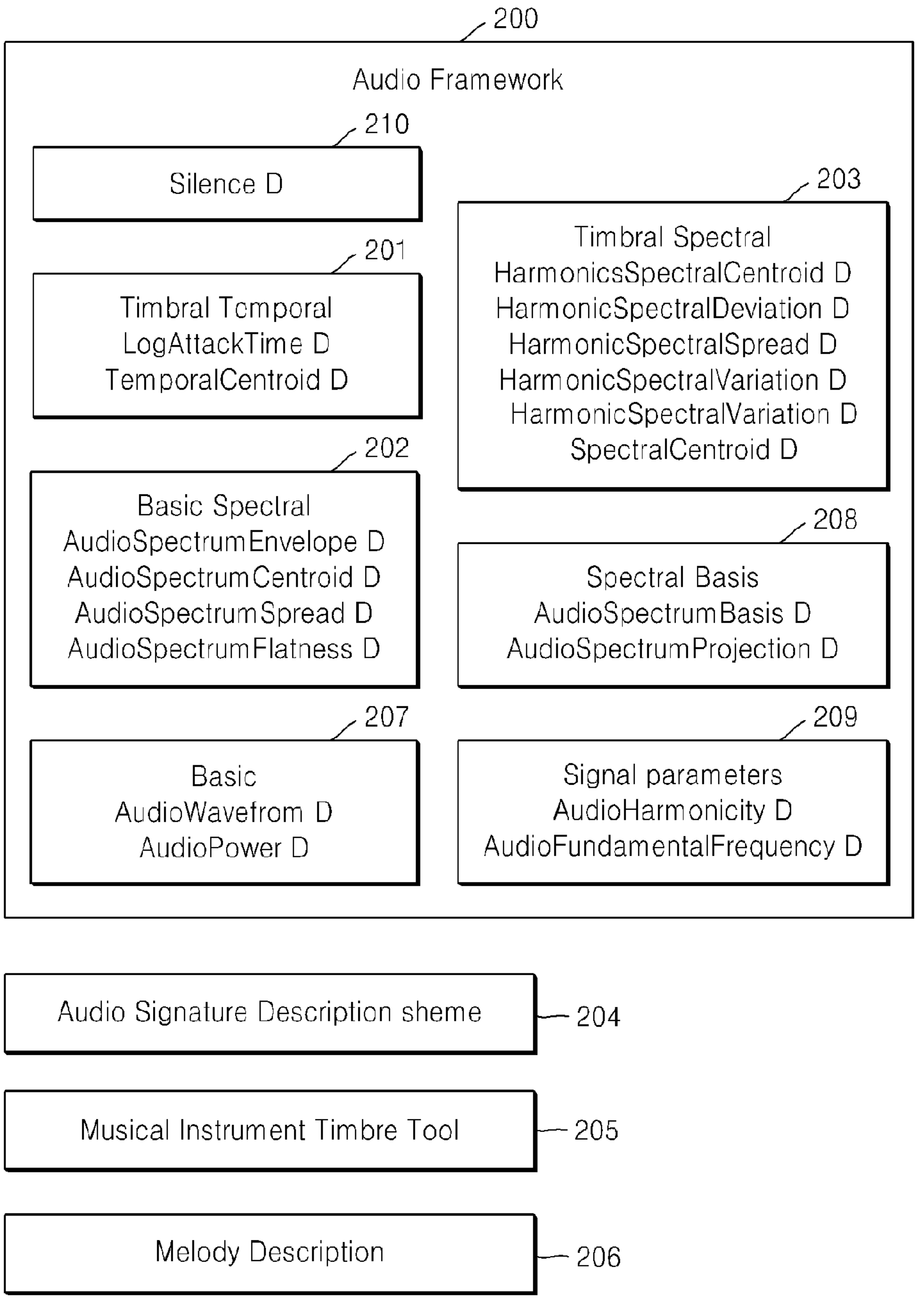

The MPEG-7 standard supports various features and tools for characterizing multimedia data. For example, referring to FIG. 2A which shows an audio framework 200, lower level features include "Timbral Temporal" 201, "Basic Spectral" 202, "Timbral Spectral" 203, etc., and upper level tools include "Audio Signature Description Scheme" 204, "Musical Instrument Timbre Tool" 205, "Melody Description" 206, etc. Referring to FIG. 2B, the "Musical Instrument Timbre Tool" 205 of the upper level tools includes four different sounds: harmonic sounds 211, inharmonic sounds 212, percussive sounds 213, and non-coherent sounds 214, and a sound feature 215 and a timbre type 217 of each sound. In addition, in a table depicted in FIG. 2B, examples of the sounds are provided in row 216. By way of an example, harmonic sounds 211 include characteristic 215 of sustained, harmonic, coherent sound. Some of the examples of this sound 216 are violin, flute, and so on. The timbre type 217 of the harmonic sound includes harmonic instrument.

Therefore, the semantic information is selected from the audio descriptors under a standard specification with regard to each multi-channel audio signal. In other words, the semantic information for each channel is defined using a predefined specification such as the one described with reference to FIGS. 2A and 2B.

In operation 120, the semantic information determined for each channel is used to determine the degree of similarity between the channels. For example, the semantic information determined for channels 1, 2, and 3 are analyzed to determine the degree of similarity between the channels 1, 2, and 3.

In operation 130, the degree of similarity between the channels is compared to a threshold to determine whether the channels are similar to each other. The similar channels have similar sound features included in the semantic information making them difficult to separate from each other.

For example, if the degree of similarity between the channels 1, 2, and 3 is within a predetermined threshold, the channels 1, 2, and 3 are determined to be similar to each other (operation 130—Yes).

If it is determined that the channels are similar to each other, in operation 140, the similar channels are divided into a plurality of sub-bands and a spatial parameter of each sub-band, such as ICTD (Inter-Channel time Difference), ICLD (Inter-Channel Level Difference), and ICC (Inter-Channel Correlation), is determined.

In operation 160, N similar channel audio signals are down-mixed to M (M<N) channel audio signals. For example, five channel audio signals are down-mixed by a linear combination to generate two channel audio signals.

Meanwhile, if it is determined that the channels are not similar to each other in operation 130 (130—No), in operation 150, multi-channel audio signals are determined to be independent channel audio signals.

In operation 170, a previously established codec (coder decoder) is used to encode the down-mixed audio signals of the similar channels or the independent channel audio signals. For example, signal compression formats, such as MP3 (MPEG Audio Layer-3) and AAC (Advanced Audio Coding), are used to encode the down-mixed audio signals, and signal compression formats, such as ACELP (Algebraic Code Exited Linear Prediction) and G.729, are used to encode the independent channel audio signals.

In operation 180, the down-mixed audio signals or the independent channel audio signals are processed as bitstreams by adding additional information thereto. The additional information includes spatial parameters, semantic information for each channel, and information about similar channels.

The additional information transmitted to a decoding apparatus may be selected from the semantic information for each channel or the information about similar channels, according to a type of the decoding apparatus.

The related art down-mixes a predetermined channel without considering the degree of similarity between channels, which makes it difficult to separate channels when audio signals are decoded, thereby deteriorating spatiality.

However, exemplary embodiment down-mixes similar channels so that a decoder can easily separate channels and maintain spatiality of multi-channels. Also, an encoder of an exemplary embodiment down-mixes similar channels and thus it is unnecessary to transmit an ICTD parameter between channels to the decoder.

Figure 3:
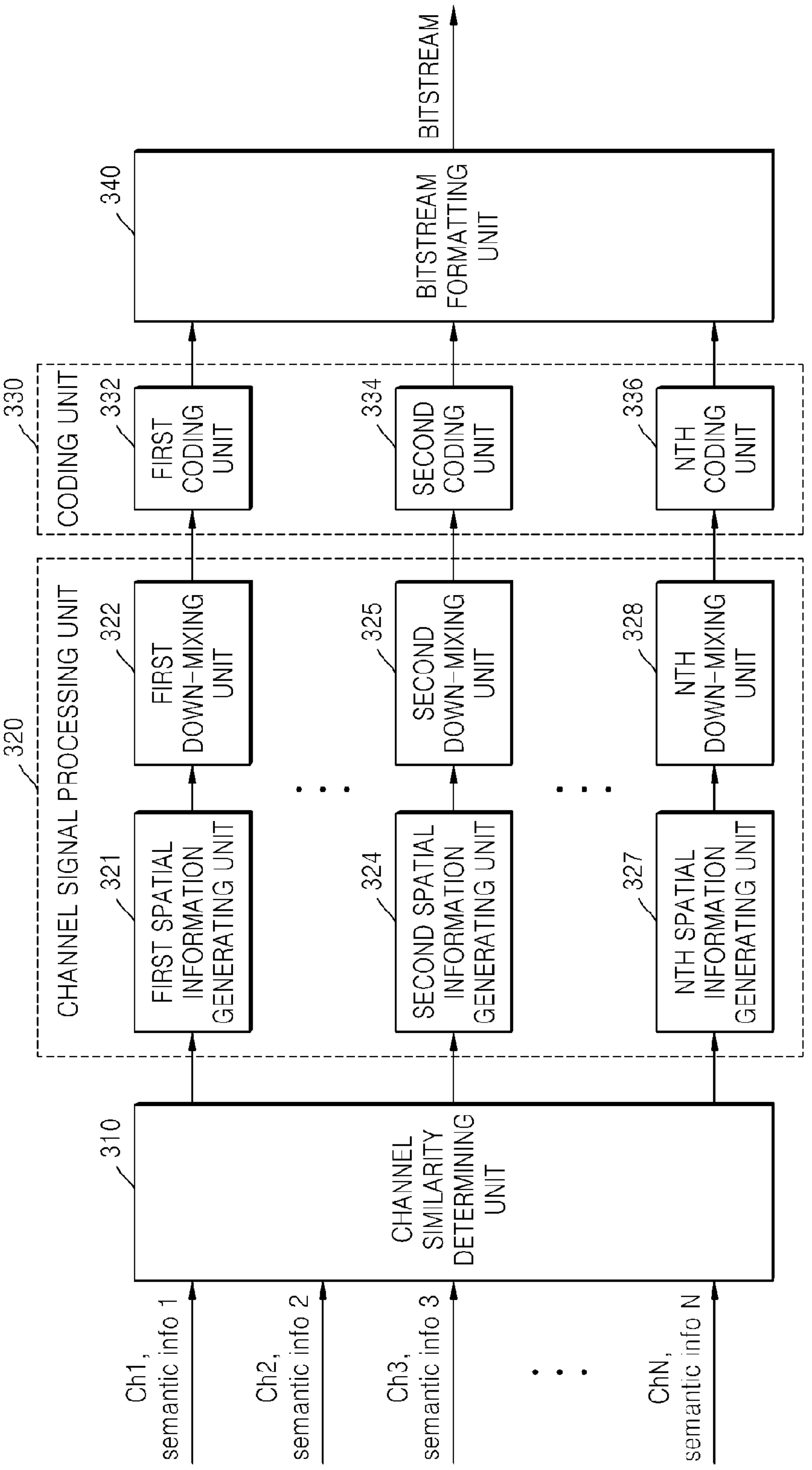
FIG. 3 is a block diagram of a multi-channel audio signal encoding apparatus according to an exemplary embodiment.

FIG. 3 is a block diagram of a multi-channel audio signal encoding apparatus according to an exemplary embodiment. Referring to FIG. 3, the multi-channel audio signal encoding apparatus includes a channel similarity determining unit 310, a channel signal processing unit 320, a coding unit 330, and a bitstream formatting unit 340.

A plurality of pieces of semantic information semantic info 1 through semantic info N are respectively set for a plurality of channels Ch1 through Ch N.

The channel similarity determining unit 310 determines the degree of similarity between the channels Ch1 through Ch N based on the semantic information (semantic info 1 through semantic info N), and determines if the channels Ch1 through Ch N are similar to each other according to the degree of similarity between the channels Ch1 through Ch N.

The channel signal processing unit 320 includes first through $N^{th}$ N spatial information generating units 321, 324, and 327 which generate spatial information and first through $N^{th}$ down-mixing units 322, 325, and 328, and which perform a down-mixing operation.

In more detail, the first through $N^{th}$ spatial information generating units 321, 324, and 327 divide audio signals of the similar channels Ch1 through Ch N determined by the channel similarity determining unit 310 into a plurality of time frequency blocks and generate spatial parameters between the similar channels Ch1 through Ch N of each time frequency block.

The first through $N^{th}$ down-mixing units 322, 325, and 328 down-mix the audio signals of the similar channels Ch1 through Ch N using a linear combination. For example, the first through $N^{th}$ down-mixing units 322, 325, and 328 down-mix audio data of N similar channels to M channel audio signals and thus first through $N^{th}$ down-mixed audio signals are generated.

The coding unit 330 includes first through $N^{th}$ coding units 332, 334, and 336, and encodes the first through $N^{th}$ down-mixed audio signals processed by the channel signal processing unit 320, using a predetermined codec.

In more detail, the first through $N^{th}$ coding units 332, 334, and 336 encode the first through $N^{th}$ down-mixed audio signals down-mixed by the first through $N^{th}$ down-mixing units 322, 325, and 328, using the predetermined codec. The coding unit 330 can also encode independent channels using an appropriate codec.

The bitstream formatting unit 340 selectively adds semantic information or information about the similar channels Ch1 through Ch N to the first through $N^{th}$ down-mixed audio signals encoded by the first through $N^{th}$ coding units 332, 334, and 336 and formats the first through $N^{th}$ down-mixed audio signals as a bitstream.

Figure 4:
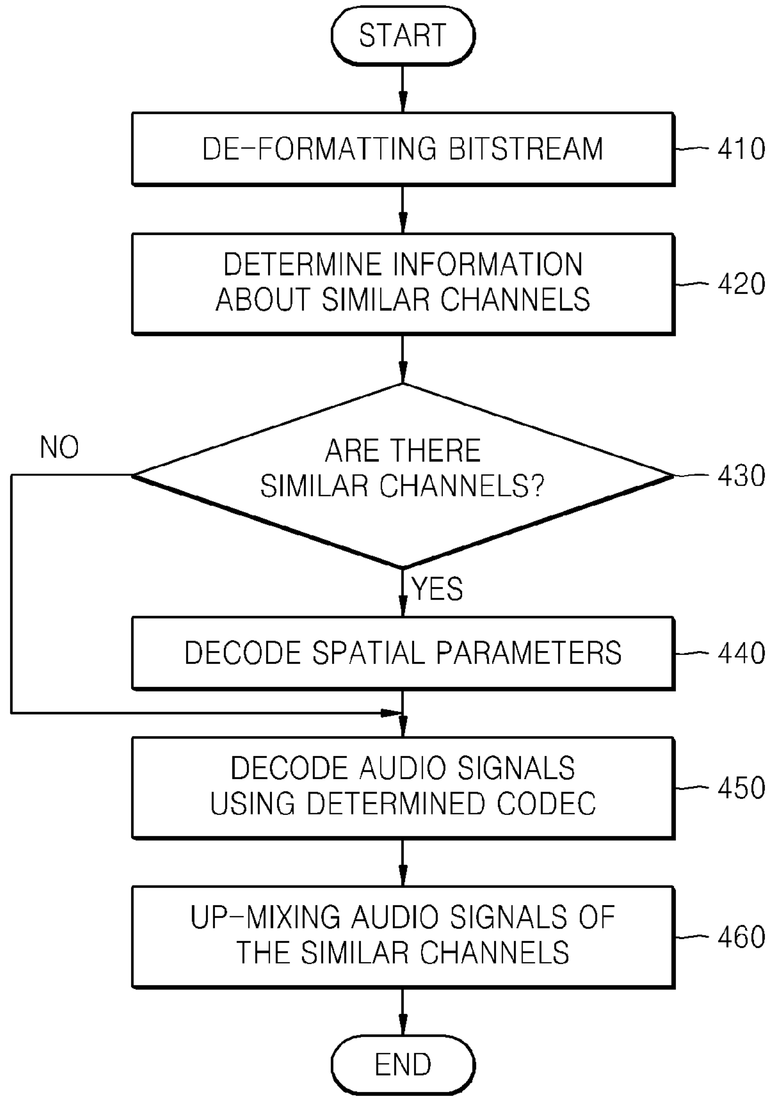
FIG. 4 is a flowchart illustrating a multi-channel audio signal decoding method according to an exemplary embodiment.

FIG. 4 is a flowchart illustrating a multi-channel audio signal decoding method according to an exemplary embodiment.

The multi-channel audio signal decoding method according to an exemplary embodiment is applied when information about similar channels is received from a multi-channel audio signal encoding apparatus.

In operation 410, a bitstream is de-formatted to extract a plurality of down-mixed audio signals and additional channel information from the de-formatted bitstream. The additional channel information includes spatial parameters and information about similar channels.

In operation 420, the information about similar channels is determined based on the additional channel information.

In operation 430, it is determined whether there are similar channels based on the information about similar channels.

If it is determined that there are similar channels (operation 430—Yes), in operation 440, the spatial parameters between the similar channels are decoded to extract an ICLD parameter and an ICC parameter from the decoded spatial parameters.

Alternatively, if it is determined that there are no similar channels (operation 430—No), it is determined that there are independent channels.

In operation 450, audio signals of the similar channels or the independent channels are individually decoded using a predetermined codec.

In operation 460, if it is determined that the channels are similar channels, the decoded audio signals of the similar channels are up-mixed to restore the multi-channel audio signals.

Figure 5:
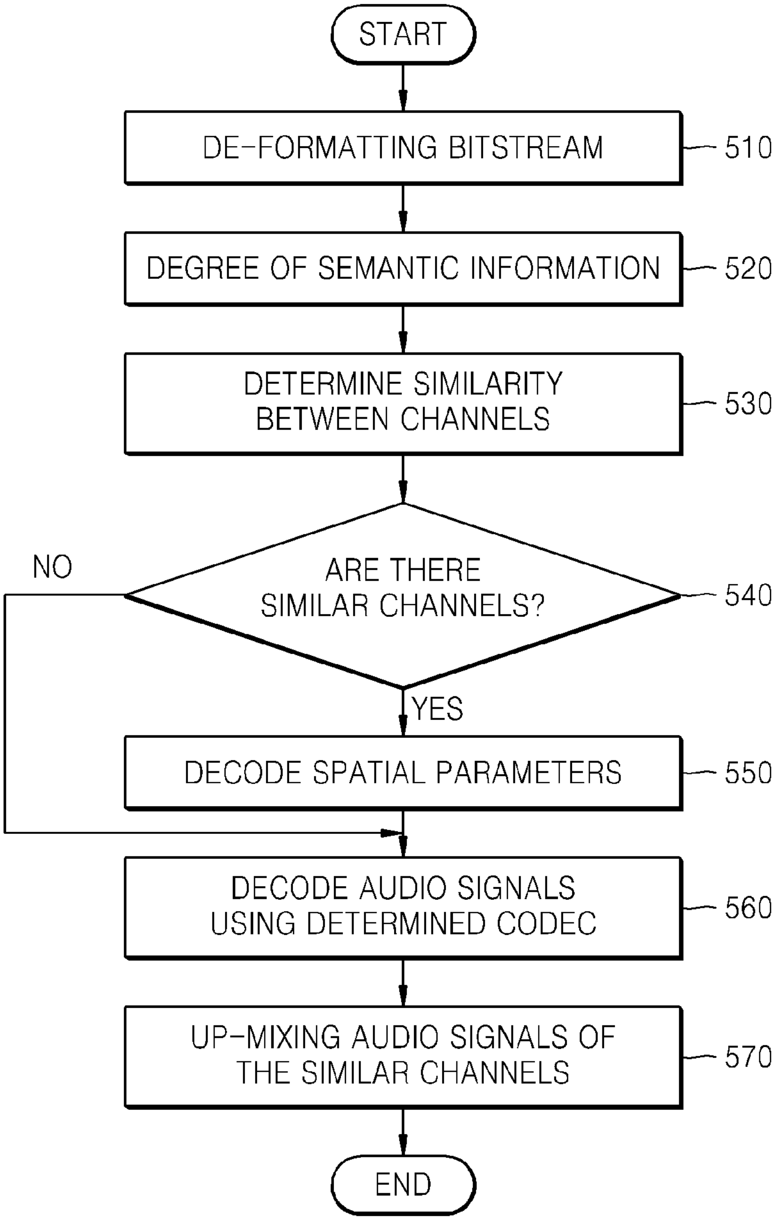
FIG. 5 is a flowchart illustrating a multi-channel audio signal decoding method according to an exemplary embodiment.

FIG. 5 is a flowchart illustrating a multi-channel audio signal decoding method according to an exemplary embodiment.

The multi-channel audio signal decoding method of an exemplary embodiment is applied when semantic information for each channel is received from a multi-channel audio signal encoding apparatus.

In operation 510, a bitstream is de-formatted to extract a plurality of down-mixed audio signals and additional channel information from the de-formatted bitstream. The additional channel information includes spatial parameters and the semantic information for each channel.

In operation 520, the semantic information for each channel is determined from the additional channel information.

In operation 530, the degree of similarity between channels is determined based on the extracted semantic information for each channel.

In operation 540, it is determined whether there are similar channels based on the degree of similarity between channels.

If it is determined that there are similar channels (operation 540—Yes), in operation 550, spatial parameters between the similar channels are decoded to determine an ICLD parameter and an ICC parameter from the decoded spatial parameters.

Alternatively, if it is determined that there are no similar channels (operation 540—No), it is determined that only independent channels are present.

In operation 560, audio signals of the similar channels or the independent channels are individually decoded using a predetermined codec.

In operation 570, if it is determined that the channels are similar channels, the decoded audio signals of the similar channels are up-mixed to restore the down-mixed audio signals of similar channels to the up-mixed channel audio signals.

Figure 6:
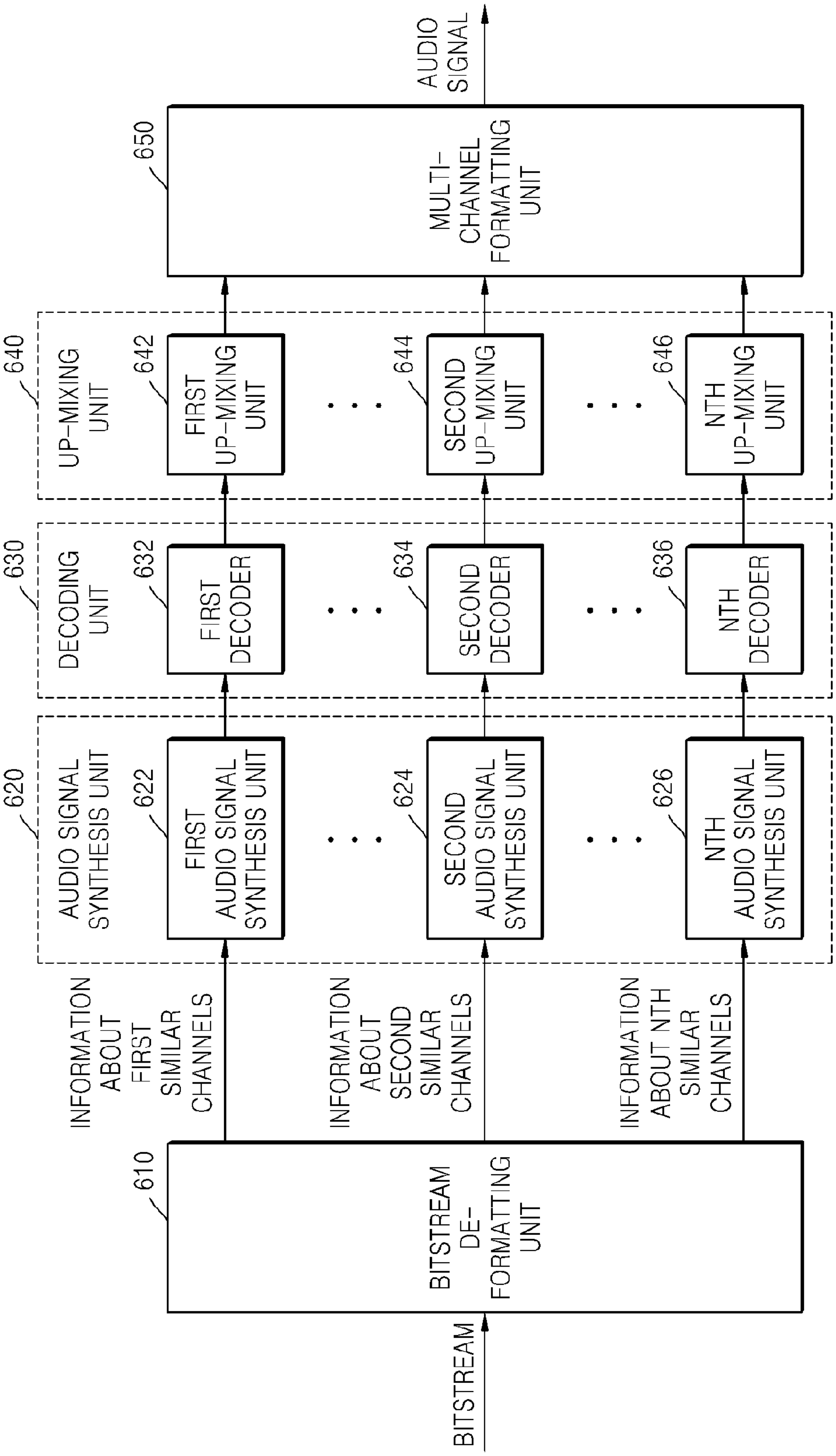
FIG. 6 is a block diagram of a multi-channel audio signal decoding apparatus according to an exemplary embodiment.

FIG. 6 is a block diagram of a multi-channel audio signal decoding apparatus according to an exemplary embodiment. Referring to FIG. 6, the multi-channel audio signal decoding apparatus includes a bitstream de-formatting unit 610, an audio signal synthesis unit 620, a decoding unit 630, an up-mixing unit 640, and a multi-channel formatting unit 650.

The bitstream de-formatting unit 610 separates down-mixed audio signals and additional channel information from a bitstream. The additional channel information includes spatial parameters and information about similar channels.

The audio signal synthesis unit 620 decodes the spatial parameters based on a plurality of pieces of information about similar channels generated by the bitstream de-formatting unit 610 and synthesizes audio signals of sub-bands using the spatial parameters. Therefore, the audio signal synthesis unit 620 outputs audio signals of first through $N^{th}$ similar channels.

For example, a first audio signal synthesis unit 622 decodes spatial parameters between similar channels based on information about the first similar channels and synthesizes audio signals of sub-bands by using the spatial parameters. A second audio signal synthesis unit 624 decodes spatial parameters between similar channels based on information about the second similar channels and synthesizes audio signals of sub-bands using the spatial parameters. An $N^{th}$ audio signal synthesis unit 626 decodes spatial parameters between similar channels based on information about the $N^{th}$ similar channels and synthesizes audio signals of sub-bands by using the spatial parameters.

The decoding unit 630 decodes the audio signals of first through $N^{th}$ similar channels output by the audio signal synthesis unit 620, using a predetermined codec. The decoding unit 630 can also decode independent channels using an appropriate codec.

For example, a first decoder 632 decodes the audio signals of similar channels synthesized by the first audio signal synthesis unit 622, using a predetermined codec. A second decoder 634 decodes the audio signals of similar channels synthesized by the second audio signal synthesis unit 624, using a predetermined codec. An $N^{th}$ decoder 636 decodes the audio signals of similar channels synthesized by the $N^{th}$ audio signal synthesis unit 626, using a predetermined codec.

The up-mixing unit 640 up-mixes each of the audio signals of the first through $N^{th}$ similar channels decoded by the decoding unit 630 to each multi-channel audio signal by using the spatial parameters. For example, a first up-mixing unit 642 up-mixes two channel audio signals decoded by the first decoder 632 to three channel audio signals. A second up-mixing unit 644 up-mixes two channel audio signals decoded by the second decoder 634 to three channel audio signals. An $N^{th}$ up-mixing unit 646 up-mixes three channel audio signals decoded by the $N^{th}$ decoder 636 to four channel audio signals.

The multi-channel formatting unit 650 formats the audio signals of the first through $N^{th}$ similar channels up-mixed by the up-mixing unit 650 to the multi-channel audio signals. For example, the multi-channel formatting unit 650 formats the three channel audio signals up-mixed by the first up-mixing unit 642, the three channel audio signals up-mixed by the second up-mixing unit 644, and the four channel audio signals up-mixed by the $N^{th}$ up-mixing unit 646, to ten channel audio signals.

Figure 7:
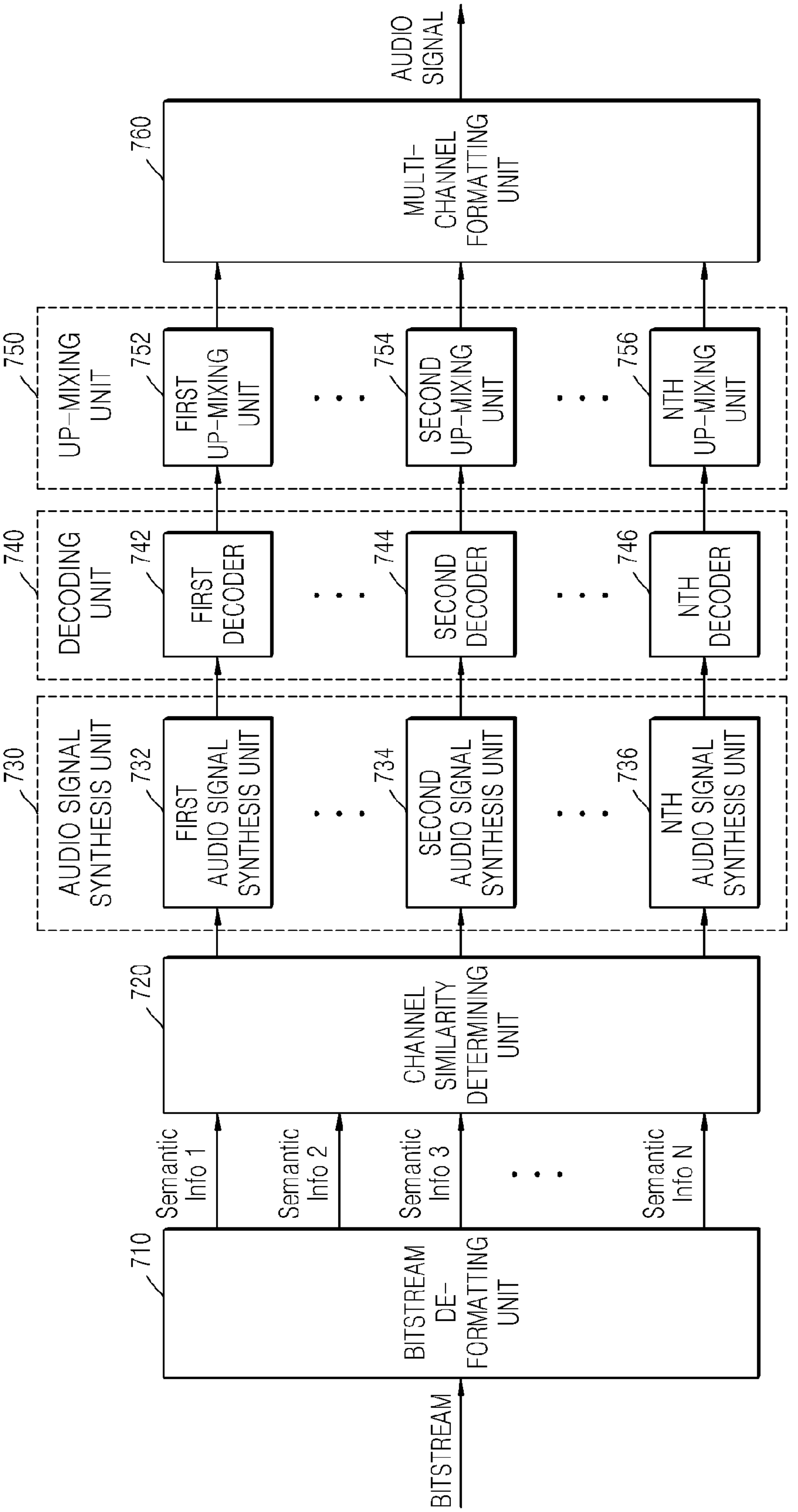
FIG. 7 is a block diagram of a multi-channel audio signal decoding apparatus according to exemplary embodiment.

FIG. 7 is a block diagram of a multi-channel audio signal decoding apparatus according to an exemplary embodiment. Referring to FIG. 7, the multi-channel audio signal decoding apparatus includes a bitstream de-formatting unit 710, a channel similarity determining unit 720, an audio signal synthesis unit 730, a decoding unit 740, an up-mixing unit 750, and a multi-channel formatting unit 760.

The bitstream de-formatting unit 710 separates down-mixed audio signals and additional channel information from a bitstream. The additional channel information includes spatial parameters and semantic information for each channel.

The channel similarity determining unit 720 determines the degree of similarity between channels based on semantic information semantic info 1 through semantic info N for each channel, and determines if the channels are similar to each other according to the degree of similarity between the channels.

The audio signal synthesis unit 730 decodes spatial parameters between the similar channels determined by the channel similarity determining unit 720 and synthesizes audio signals of sub-bands using the spatial parameters.

For example, a first audio signal synthesis unit 732 decodes spatial parameters between first similar channels determined by the channel similarity determining unit 720 and synthesizes audio signals of sub-bands by using the spatial parameters. A second audio signal synthesis unit 734 decodes spatial parameters between second similar channels determined by the channel similarity determining unit 720 and synthesizes audio signals of sub-bands by using the spatial parameters. An $N^{th}$ audio signal synthesis unit 736 decodes spatial parameters between $N^{th}$ similar channels determined by the channel similarity determining unit 720 and synthesizes audio signals of sub-bands by using the spatial parameters.

The decoding unit 740 decodes audio signals of the first through $N^{th}$ similar channels synthesized by the audio signal synthesis unit 730, using a predetermined codec. The operations of first through $N^{th}$ decoders 742, 744, and 746 are analogous to the operations of the first through $N^{th}$ decoders 632, 634, and 636 described with reference to FIG. 6 and thus a detailed description thereof will not be repeated here.

The up-mixing unit 750 up-mixes each of the audio signals of the first through $N^{th}$ similar channels decoded by the decoding unit 740 to each multi-channel audio signal using the spatial parameters. The operations of first through $N^{th}$ up-mixing units 752, 754, and 756 are analogous to the operations of the first through $N^{th}$ up-mixing units 642, 644, and 646 described with reference to FIG. 6 and thus a detailed description thereof will not be repeated here.

The multi-channel formatting unit 760 formats the audio signals of the first through $N^{th}$ similar channels up-mixed by the up-mixing unit 750 to the multi-channel audio signals.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While exemplary embodiments have been particularly shown and described, it will be understood by those of ordinary skill in the art that various changes in form and details may be made therein without departing from the spirit and scope of the present invention as defined by the following claims.

What is claimed is:

1. A multi-channel audio signal encoding method, the method comprising:

obtaining semantic information for each channel of a plurality of channels of the multi-channel audio signal;

determining a degree of similarity between the plurality of channels based on the obtained semantic information for each channel;

determining similar channels among the plurality of channels based on the determined degree of similarity between the multi-channels; and determining spatial parameters between the similar channels and down-mixing audio signals of the similar channels using the similar channels so as to enhance a channel separation on a decoder, wherein the determining the similar channels comprises comparing the determined degree of similarity between the plurality of channels with a predetermined threshold.

2. The method of claim 1, wherein the similar channels have similar sound frequency characteristics.

3. The method of claim 1, further comprising: encoding audio signals of channels that are not similar to each other as audio signals of independent channels or encoding the down-mixed audio signals of the similar channels.

4. The method of claim 1, wherein the semantic information for each channel is an audio semantic descriptor.

5. The method of claim 1, wherein the semantic information for each channel uses at least one of descriptors of an MPEG-7 standard.

6. The method of claim 1, further comprising: generating a bitstream by adding the semantic information for each channel to the down-mixed audio signals of the similar channels.

7. The method of claim 1, further comprising: generating a bitstream by adding information about the similar channels to the down-mixed audio signals.

8. The method of claim 1, wherein the determining the spatial parameters comprises: dividing the audio signals of the similar channels into a plurality of sub-bands and determining the spatial parameters between the similar channels of each of the plurality of sub-bands.

9. The method of claim 1, further comprising: encoding the down-mixed audio signals of the similar channels or the audio signals of independent channels by using a predetermined codec, wherein the audio signals of the independent channels encoded without being down-mixed.

10. The method of claim 1, wherein an Inter-Channel time Difference among the extracted spatial parameters is not transmitted to a decoder.

11. A multi-channel audio signal decoding method, the method comprising:

determining information about similar channels from an audio bitstream;

extracting audio signals of the similar channels from the audio bitstream based on the determined information; and decoding spatial parameters between the similar channels and up-mixing the extracted audio signals of the similar channels using similar channels so as to enhance a channel separation, wherein the determining comprises comparing a degree of similarity between the channels with a predetermined threshold.

12. A multi-channel audio signal decoding method, the method comprising:

determining semantic information from an audio bitstream;

determining a degree of similarity between channels based on the determined semantic information using similar channels so as to enhance a channel separation;

extracting audio signals of the similar channels from the audio bitstream based on the determined degree of similarity between the channels;

decoding spatial parameters between similar channels and up-mixing the extracted audio signals of the similar channels, wherein the determining the degree of similarity between the channels comprises comparing the degree of similarity between multi-channels with a predetermined threshold.

13. A multi-channel audio signal encoding apparatus, the apparatus comprising:

a channel similarity determining unit which determines a degree of similarity between multi-channels based on semantic information for each channel;

a channel signal processing unit which generates spatial parameters between similar channels determined by the channel similarity determining unit, and down-mixes audio signals of the similar channels using the similar channels so as to enhance a channel separation on a decoder;

a coding unit which encodes the down-mixed audio signals of the similar channels processed by the signal processing unit by using a predetermined codec; and a bitstream formatting unit which adds the semantic information for each channel or information about the similar channels to the audio signals encoded by the coding unit, and formats the audio signals as a bitstream, wherein the channel similarity determining unit compares the degree of similarity between multi-channels with a predetermined threshold.

14. The apparatus of claim 13, wherein the channel signal processing unit comprises:

a space information generating unit which divides the similar channels into time-frequency blocks, and generates spatial parameters between the similar channels of each time-frequency block; and a down-mixing unit which down-mixes the audio signals of the similar channels.

15. A multi-channel audio signal decoding apparatus, the apparatus comprising:

a channel similarity determining unit which determines a degree of similarity between a plurality of channels of the multi-channel audio signal from semantic information for each channel and extracts audio signals of similar channels based on the determined degree of similarity between the plurality of channels;

an audio signal synthesis unit which decodes spatial parameters between the similar channels extracted by the channel similarity determining unit using the similar channels so as to enhance a channel separation, and synthesizes the extracted audio signals of each sub-band by using the spatial parameters;

a decoding unit which decodes the audio signals synthesized by the audio signal synthesis unit by using a predetermined codec; and an up-mixing unit which up-mixes the audio signals of the similar channels decoded by the decoding unit, wherein the channel similarity determining unit compares the degree of similarity between the plurality of channels with a predetermined threshold.

16. A non-transitory computer readable recording medium having recorded thereon a program for executing the method of claim 1.

17. A non-transitory computer readable recording medium storing instruction for encoding a multi-channel audio signal, the instructions comprising:

determining semantic information for at least two channels of the multi-channel audio
signal;

determining degree of similarity between the at least two channels based on the determined semantic information using similar channels so as to enhance a channel separation on a decoder; and if the degree of similarity exceed a predetermined threshold, extract spatial parameters between the at least two channels and down-mix audio signals of the at least two channels:

wherein the determining the degree of similarity comprises comparing a degree of similarity between the at least two channels with a predetermined threshold.

18. The non-transitory computer readable recording medium of claim 17, further comprising if the degree of similarity does not a exceed a predetermined threshold, encoding the audio signals of the at least two channels without down-mixing the audio signals.

19. The non-transitory computer readable recording medium of claim 18, wherein the audio signals of the at least two channels are encoded in different formats depending on whether the determined degree of similarity exceeds the predetermined threshold.

20. The non-transitory computer readable recording medium of claim 17, wherein the semantic information comprises sound characteristics, timbre type and a description of a family of sounds.

* * * * *